United States Patent
Inagaki et al.

(10) Patent No.: US 12,243,697 B2
(45) Date of Patent: Mar. 4, 2025

(54) DIRECT-CURRENT CIRCUIT BREAKER AND DIRECT-CURRENT CIRCUIT BREAKER SYSTEM

(71) Applicant: Mitsubishi Electric Corporation, Tokyo (JP)

(72) Inventors: Takashi Inagaki, Tokyo (JP); Sho Tokoyoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 98 days.

(21) Appl. No.: 18/247,304

(22) PCT Filed: Dec. 9, 2020

(86) PCT No.: PCT/JP2020/045906
§ 371 (c)(1),
(2) Date: Mar. 30, 2023

(87) PCT Pub. No.: WO2022/123700
PCT Pub. Date: Jun. 16, 2022

(65) Prior Publication Data
US 2023/0411091 A1    Dec. 21, 2023

(51) Int. Cl.
*H01H 33/59* (2006.01)
*H02H 3/087* (2006.01)
*H01H 9/54* (2006.01)

(52) U.S. Cl.
CPC .......... *H01H 33/596* (2013.01); *H02H 3/087* (2013.01); *H01H 9/542* (2013.01)

(58) Field of Classification Search
CPC ....... H01H 33/596; H01H 9/542; H02H 3/087
See application file for complete search history.

(56) References Cited

U.S. PATENT DOCUMENTS

| 4,740,858 A * | 4/1988 | Yamaguchi | H01H 33/596 |
| | | | 361/4 |
| 8,837,093 B2 * | 9/2014 | Panousis | H01H 33/75 |
| | | | 361/13 |

(Continued)

FOREIGN PATENT DOCUMENTS

| EP | 2523205 A1 * | 11/2012 | ........... H01H 33/596 |
| EP | 3843118 A1 | 6/2021 | |

(Continued)

OTHER PUBLICATIONS

International Search Report (PCT/ISA/210) with translation and Written Opinion (PCT/ISA/237) mailed on Feb. 16, 2021 by the Japan Patent Office as the International Searching Authority for International Application No. PCT/JP2020/045906. (8 pages).

(Continued)

*Primary Examiner* — Dharti H Patel
*Assistant Examiner* — Christopher J Clark
(74) *Attorney, Agent, or Firm* — BUCHANAN, INGERSOLL & ROONEY PC

(57) ABSTRACT

A direct-current circuit breaker that includes: an interrupter; a resonance circuit including a capacitor, a reactor, and an activation switch; a voltage detection circuit; a charging circuit including a charging resistor and a charging switch; and a control circuit. The control circuit closes the charging switch to charge the capacitor, and thereafter, the control circuit opens the charging switch when the charging voltage exceeds a first voltage value, and closes the charging switch when the charging voltage falls below a second voltage value that is smaller than the first voltage value.

4 Claims, 10 Drawing Sheets

(56) References Cited

U.S. PATENT DOCUMENTS

| | | | |
|---|---|---|---|
| 11,289,899 B2 | 3/2022 | Tokoyoda et al. | |
| 11,380,500 B2 | 7/2022 | Tokoyoda et al. | |
| 2013/0070492 A1* | 3/2013 | Skarby | H01H 33/596 363/51 |
| 2016/0329179 A1* | 11/2016 | Kim | H01H 33/596 |
| 2021/0111556 A1 | 4/2021 | Tokoyoda et al. | |
| 2021/0358702 A1 | 11/2021 | Tokoyoda et al. | |

FOREIGN PATENT DOCUMENTS

| | | | | |
|---|---|---|---|---|
| EP | 3896714 A1 | 10/2021 | | |
| EP | 3843118 B1 | 3/2023 | | |
| EP | 3896714 B1 | 3/2024 | | |
| WO | 2013164874 A1 | 11/2013 | | |
| WO | WO-2014154260 A1 * | 10/2014 | | H01H 33/165 |
| WO | 2020/039580 A1 | 2/2020 | | |
| WO | 2020/121369 A1 | 6/2020 | | |

OTHER PUBLICATIONS

Extended European Search Report dated Feb. 6, 2024, issued in the corresponding European Patent Application No. 20965083.7, 7 pages.

* cited by examiner

DIRECT-CURRENT CIRCUIT BREAKER AND DIRECT-CURRENT CIRCUIT BREAKER SYSTEM

FIELD

The present disclosure relates to a forced extinction-type direct-current circuit breaker and a direct-current circuit breaker system.

BACKGROUND

In a case where a direct-current circuit breaker is applied to multi-terminal high voltage direct current (HVDC) power transmission, when a direct-current accident occurs in a system, it is required to interrupt direct current within a certain period of time. In a multi-terminal HVDC system, when direct-current system voltage falls below a threshold of the operable voltage of a converter connecting an alternate current-side system and a direct current-side system, the converter itself stops operation to cause system collapse. Therefore, in order to maintain operation of the multi-terminal HVDC power transmission system even when a ground fault or a short-circuit fault occurs, it is necessary to quickly interrupt accident current by means of a direct-current circuit breaker after the occurrence of the accident, and to prevent the direct-current system voltage from decreasing to the threshold or less.

A forced extinction-type direct-current circuit breaker includes a resonance circuit including a capacitor and a reactor, and performs extinction of arc in which a resonance current generated by an electric discharge of the capacitor is superimposed on a direct current to create a current zero point, and the direct current is interrupted at the current zero point. In the technique disclosed in Patent Literature 1, a charging resistor and a charging switch that are grounded are located between and connected to a capacitor and a reactor of a resonance circuit, and when the charging switch is closed, the capacitor is charged to a system voltage via the charging resistor. When an accident occurs in a system, the charging switch is controlled such that the charging switch is opened.

CITATION LIST

Patent Literature

Patent Literature 1: WO 2013/164874 A

SUMMARY

Technical Problem

However, in the technique disclosed in Patent Literature 1, since the charging resistor is constantly connected to the ground in a steady state, the charge of the capacitor is released via the charging resistor. The capacitor is charged by a potential difference from the system voltage. Therefore, charging and discharging are repeated. In the technique disclosed in Patent Literature 1, since charging and discharging of the capacitor constantly occur, power capacity of the charging resistor increases. As a result, the charging resistor increases in size.

The present disclosure has been made in view of the above, and an object of the present disclosure is to obtain a direct-current circuit breaker and a direct-current circuit breaker system capable of achieving downsizing of a charging resistor.

Solution to Problem

To solve the above problems and achieve the object, a direct-current circuit breaker according to the present disclosure includes: an interrupter inserted in a direct-current line, the interrupter is closed in a steady state; a resonance circuit connected in parallel to the interrupter, the resonance circuit includes a capacitor, a reactor, and a first switch connected in series with each other, the first switch is open in a steady state; a voltage detection circuit adapted to detect a charging voltage of the capacitor; a charging circuit adapted to charge the capacitor at a direct-current potential of the direct-current line, the charging circuit includes a charging resistor and a second switch connected in series, the charging resistor is grounded; and a control circuit adapted to interrupt a direct current flowing through the direct-current line when an accident occurs, by closing the first switch, superimposing a resonance current generated by the resonance circuit on the direct current to create a current zero point, and opening the interrupter. The control circuit is adapted to: close the second switch to charge the capacitor; thereafter, open the second switch when the charging voltage having been detected exceeds a first voltage value; and close the second switch when the charging voltage having been detected falls below a second voltage value that is smaller than the first voltage value.

Advantageous Effects of Invention

The direct-current circuit breaker of the present disclosure has the effect of enabling downsizing of a charging resistor.

DESCRIPTION OF EMBODIMENTS

Hereinafter, direct-current circuit breakers and a direct-current circuit breaker system according to embodiments will be described in detail with reference to the drawings.

First Embodiment

Figure 1:
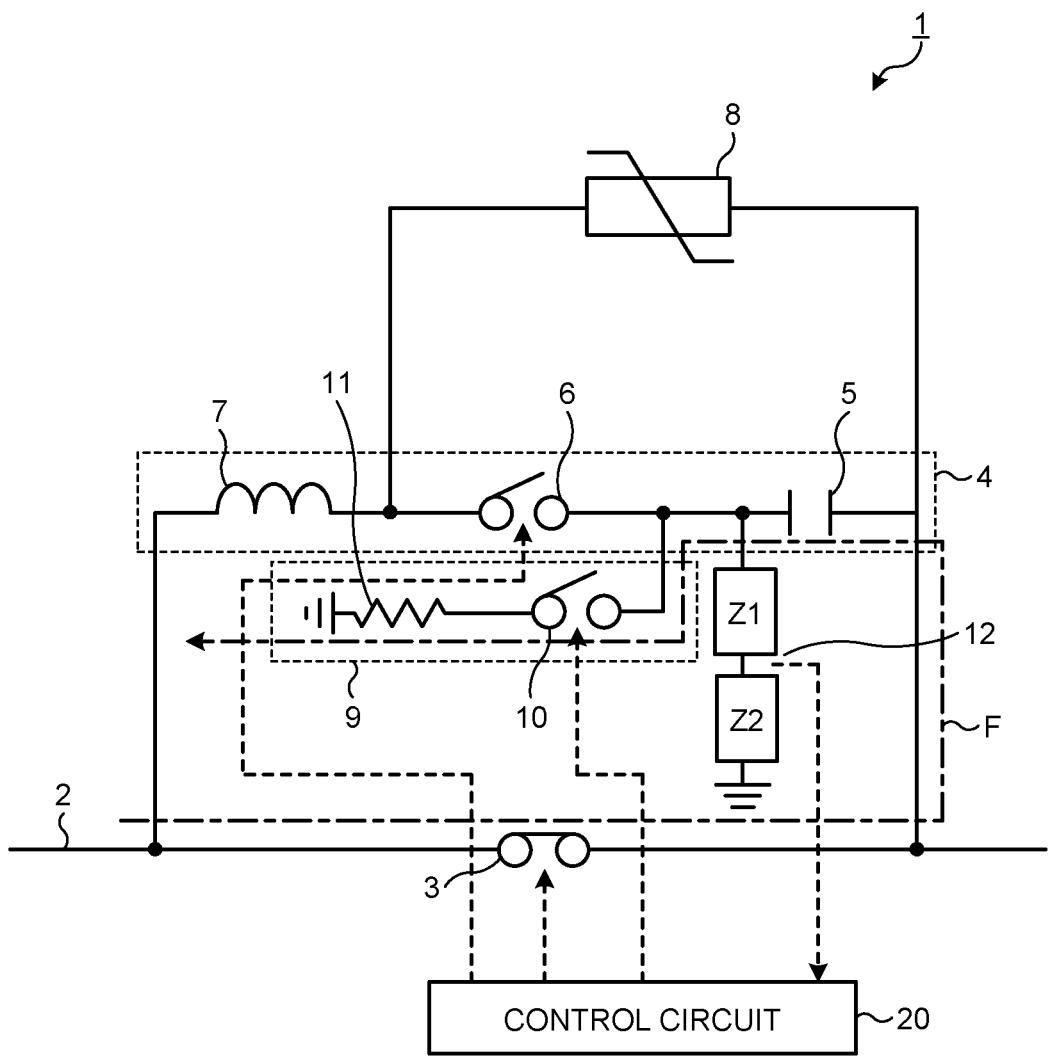
FIG. 1 is a diagram illustrating a configuration of a direct-current circuit breaker according to a first embodiment.

FIG. 1 is a diagram illustrating a configuration of a direct-current circuit breaker 1 according to a first embodiment. The direct-current circuit breaker 1 according to the first embodiment is a forced extinction-type mechanical direct-current circuit breaker (DCCB). The direct-current circuit breaker 1 is provided on a direct-current line 2 of a power system. On the left side of the direct-current circuit breaker 1 in the drawing, the direct-current line 2 is connected to a converter (not illustrated) of the power system. The converter converts alternating-current power into direct-current power.

In the first embodiment, the power system performs multi-terminal HVDC power transmission. The direct-current circuit breaker 1 protects the power system by interrupting direct current when an accident such as a short circuit or a ground fault occurs on the direct-current line 2. The direct-current circuit breaker 1 interrupts direct current flowing through the direct-current line 2 at a current zero point created by the superimposing of a resonance current, which is an oscillating current, on the direct current.

The direct-current circuit breaker 1 includes: an interrupter 3 provided on the direct-current line 2; a resonance circuit 4; a lightning arrester 8; a charging circuit 9; a voltage detection circuit 12; and a control circuit 20 that controls the entire direct-current circuit breaker 1. The resonance circuit 4 includes a capacitor 5, an activation switch 6 as a first switch, and a reactor 7. The lightning arrester 8 suppresses overvoltage exceeding a voltage level based on withstand voltage specifications of the DCCB. The charging circuit 9: is a circuit that charges the capacitor 5 at a direct-current potential of the direct-current line 2; and includes a charging switch 10 as a second switch and a charging resistor 11. The charging resistor 11 is grounded; and the charging switch and the charging resistor 11 are connected in series.

The voltage detection circuit 12 detects a charging voltage Vc of the capacitor 5. The voltage detection circuit 12 includes, for example, a voltage dividing circuit including a resistor Z1 and a resistor Z2. The resistor Z1 and the resistor Z2 are connected in series; one end of the resistor Z1 is connected to a connecting point between the capacitor 5 and the activation switch 6; and one end of the resistor Z2 is grounded. The capacitor 5, the activation switch 6, and the reactor 7 are connected in series with each other. The capacitor 5, the activation switch 6, and the reactor 7 are connected in parallel to the interrupter 3. The lightning arrester 8 is connected in parallel to the capacitor 5 and the activation switch 6.

The interrupter 3 is inserted in the direct-current line 2, and is closed in a steady state. The interrupter 3 interrupts direct current at a current zero point created by resonance current and the direct current canceling each other. That is, the interrupter 3 interrupts direct current by forced extinction. The interrupter 3 is a breaker capable of interrupting current at high speed, and is, for example, a vacuum circuit breaker (VCB). The capacitor 5 and the reactor 7 generate a resonance current by discharging the capacitor 5. The activation switch 6 is a switch for closing the circuit so as to create the current zero point.

Figure 2:
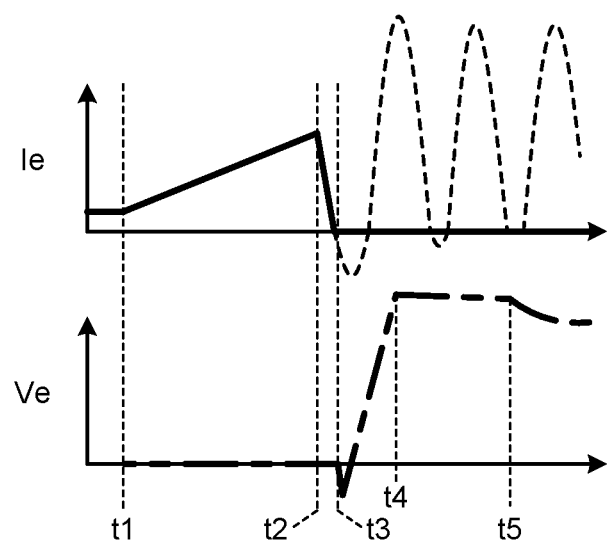
FIG. 2 is a time chart for describing operation of the direct-current circuit breaker according to the first embodiment.

FIG. 2 is a time chart for describing operation of the direct-current circuit breaker 1 according to the first embodiment. The upper diagram of FIG. 2 illustrates the waveform of a current Ie that flows through the interrupter 3 when an accident occurs; and the lower diagram of FIG. 2 illustrates the waveform of a voltage Ve that is applied to the interrupter 3 when the accident occurs. A broken line in the upper diagram of FIG. 2 indicates the waveform of resonance current. In a steady state in which the power system remains steady, the interrupter 3 is in a closed state, and the activation switch 6 is in an open state. The capacitor 5 is charged by the charging circuit 9. Charging operation will be described below. When an accident occurs in the power system (time t1), an accident current larger than a steady current flows through the direct-current line 2, as illustrated in the upper diagram of FIG. 2. As a result, the current Ie rapidly increases. Unlike a current flowing in an alternating-current system, a current flowing in a direct-current system does not periodically create the current zero point. Therefore, it is necessary to interrupt the current by creating the current zero point in some way.

When an accident occurs in the power system, the control circuit 20 closes the activation switch 6. When the activation switch 6 is closed, the charge of the capacitor 5 is released from the capacitor 5 to a loop including the activation switch 6, the capacitor 5, the reactor 7, and the interrupter 3. As a result of the release of charge from the capacitor 5, a resonance current flows from the capacitor 5 through the reactor 7, the interrupter 3, and the activation switch 6. Thus, the direct-current circuit breaker 1 superimposes, on the accident current, an oscillating current flowing in a direction opposite to the direction of a direct current that is the accident current in the interrupter 3 (time t2). The current zero point is created by the superimposing of the oscillating current on the accident current (time t3). At the timing when the current zero point is created, the control circuit 20 opens the interrupter 3 to interrupt the current. In this way, extinction of arc, that is, current interruption is completed in the interrupter 3.

The peak value of a resonance current Ig to be superimposed on the accident current can be calculated by equation (1).

$$Ig = \sqrt{(Cp/Lp)} \times Vc \qquad (1)$$

Here, the symbol "Cp" denotes the capacitance of the capacitor 5, the symbol "Lp" denotes the reactance of the reactor 7, and the symbol "Vc" denotes the charging voltage of the capacitor 5. Each parameter of equation (1) is adjusted such that the peak value of LC resonance current is larger than the value of current to be interrupted.

As a result of forcible interruption of the accident current, electromagnetic energy remains in the system. The lightning arrester 8 starts energy processing at time t4 at which the voltage Ve reaches a certain voltage value. The lightning arrester 8 suppresses an increase in the voltage Ve by performing energy processing from time t4 to time t5. As described above, the lightning arrester 8 processes energy remaining in the power system after the arc is extinguished by the interrupter 3.

Next, a method for charging the capacitor 5 will be described. The charging voltage Vc of the capacitor 5 is detected by the voltage detection circuit 12. The voltage detection circuit 12 outputs the detected charging voltage Vc to the control circuit 20. The voltage detection circuit 12 includes the voltage dividing circuit including the resistor Z1 and the resistor Z2. The voltage detection circuit 12 detects a divided voltage of the resistor Z2, and inputs the divided voltage to the control circuit 20. The control circuit 20 obtains the charging voltage Vc of the capacitor 5 based on the divided voltage of the resistor Z2 and the respective resistance values of the resistor Z1 and the resistor Z2. The voltage detection circuit 12 may detect the charging voltage Vc by using a technique other than the voltage dividing circuit.

Figure 3:
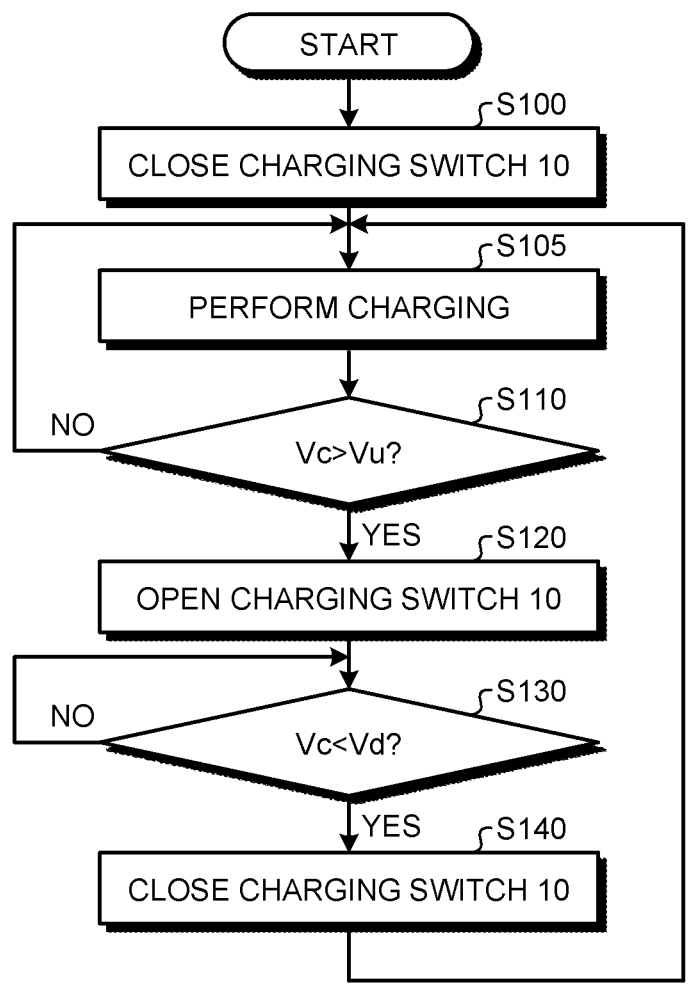
FIG. 3 is a flowchart illustrating charging operation of a control circuit in the first embodiment.
Figure 4:
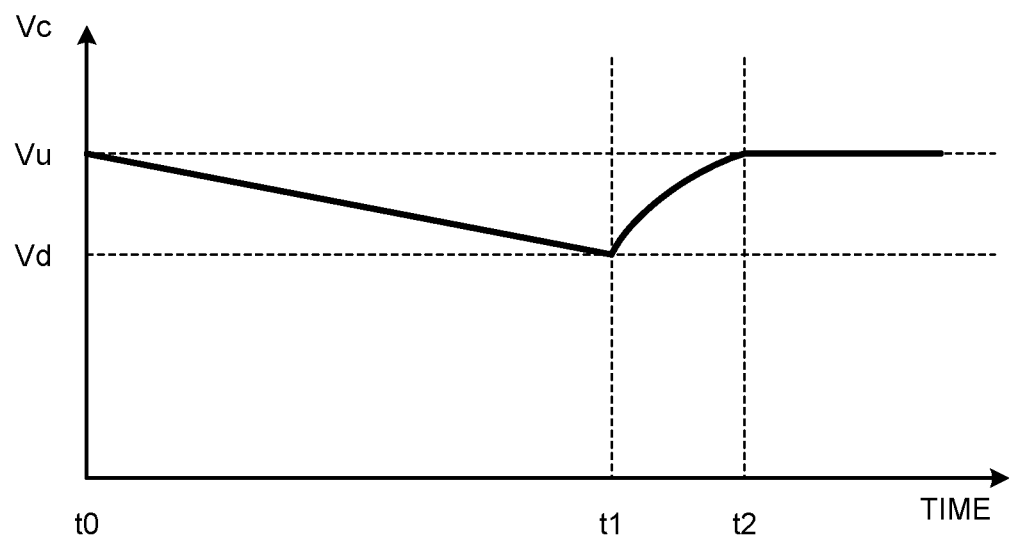
FIG. 4 is a time chart illustrating a temporal change in charging voltage of a capacitor of the direct-current circuit breaker in the first embodiment.

FIG. 3 is a flowchart illustrating charging operation of the control circuit 20. FIG. 4 is a time chart illustrating a temporal change in the charging voltage Vc of the capacitor 5. When operation of the direct-current circuit breaker 1 is started, the control circuit 20 closes the charging switch 10 (step S100). As a result, the capacitor 5 is charged through a charging path indicated by arrow F in FIG. 1, so that the charging voltage Vc increases (step S105). The control circuit 20 monitors the charging voltage Vc obtained from a value detected by the voltage detection circuit 12. When the charging of the capacitor 5 is completed, that is, when the charging voltage Vc reaches a first voltage value Vu (step S110: Yes), the control circuit 20 opens the charging switch 10 (step S120). This prevents the capacitor 5 from being discharged via the charging resistor 11 that is constantly grounded. The charging switch 10 is a switch that can interrupt current. The first voltage value Vu is, for example, a rated voltage of a module included in the direct-current circuit breaker 1, and functions as an upper limit for charging voltage control.

However, even when the charging switch 10 is opened, the charge of the capacitor 5 is released through self-discharge due to the influence of the floating impedance (including the floating capacitance and the like of the charging switch 10) inherent in the circuit. When the charging voltage Vc of the capacitor 5 falls below a certain voltage value, the peak value of the resonance current obtained by equation (1) falls below breaking current depending on the breaking current. Thus, there is a possibility that the current zero point cannot be created, so that current interruption cannot be performed. Therefore, when the charging voltage Vc falls below a second voltage value Vd (step S130: Yes), the control circuit 20 closes the charging switch 10 (step S140). The second voltage value Vd is slightly smaller than the first voltage value Vu by a value a, and functions as a lower limit for charging voltage control.

When the charging switch 10 is closed, the capacitor 5 is recharged, and the charging voltage Vc increases again (step S105). Operations of steps S105 to S140 are repeated until operation of the direct-current circuit breaker 1 is completed. The control circuit 20 keeps the charging voltage Vc within a range from the second voltage value Vd to the first voltage value Vu by performing such control.

Assuming that the rated voltage of the module included in the direct-current circuit breaker 1 is 80 kV, the first voltage value Vu is set to, for example, 80 kV, and the second voltage value Vd is set to a value slightly smaller than 80 kV by the value a.

In FIG. 4, a period from time t0 to time t1 indicates a period of self-discharge due to floating impedance after completion of the charging of the capacitor During the period of self-discharge, the charging switch 10 is in an open state. At time t1 at which the charging voltage Vc falls below the second voltage value Vd, the charging switch 10 is closed. As a result, the capacitor 5 is recharged, and the charging voltage Vc increases again. At time t2 at which the charging voltage Vc exceeds the first voltage value Vu, the charging switch is opened. This prevents the capacitor 5 from being discharged via the charging resistor 11.

In the first embodiment, when the charging voltage Vc exceeds the first voltage value Vu, the charging switch 10 is opened, and when the charging voltage Vc falls below the second voltage value Vd, the charging switch 10 is closed, as described above. Therefore, the charging voltage Vc can be kept within the range from the second voltage value Vd to the first voltage value Vu. As a result, the charging resistor 11 can be downsized.

Second Embodiment

Figure 5:
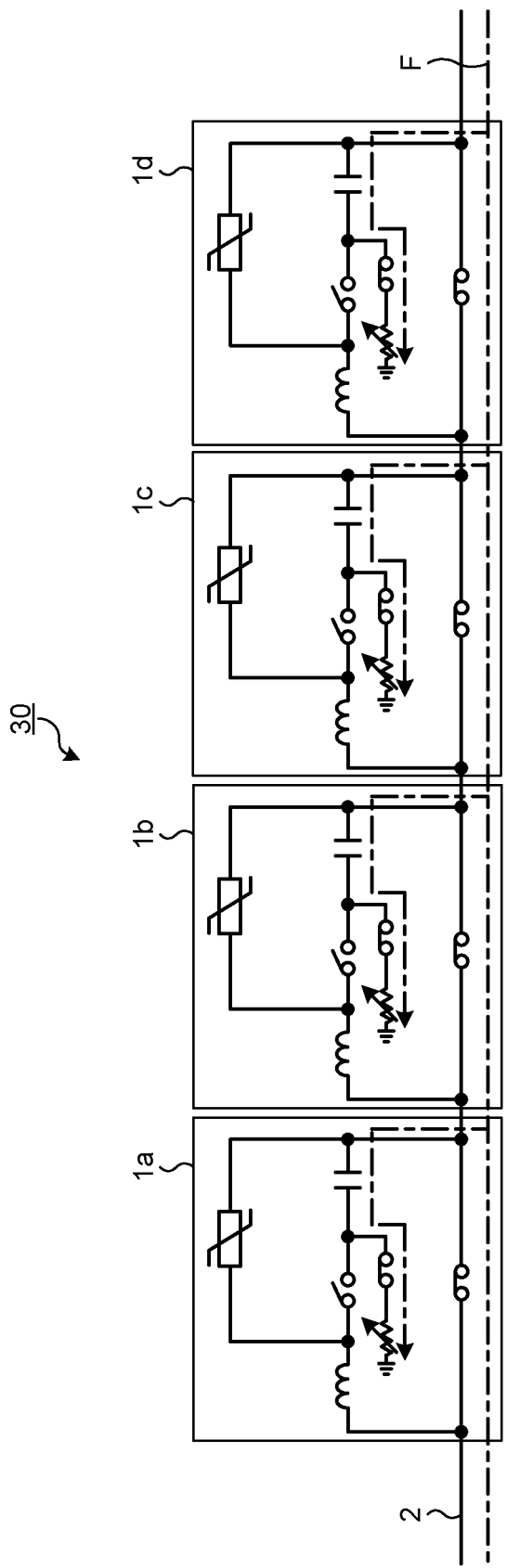
FIG. 5 is a diagram illustrating a configuration of a direct-current circuit breaker system according to a second embodiment.
Figure 6:
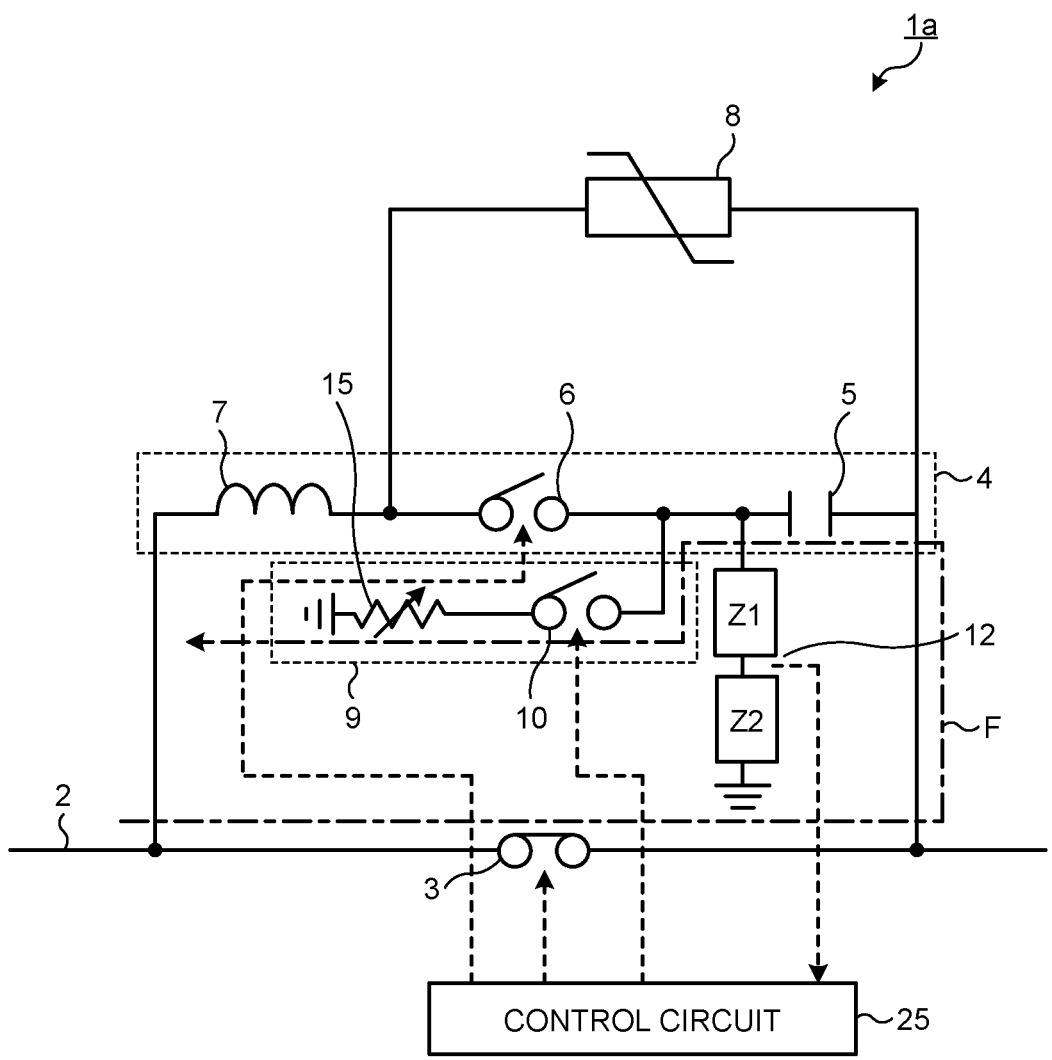
FIG. 6 is a diagram illustrating a configuration of a direct-current circuit breaker according to the second embodiment.

FIG. 5 is a diagram illustrating a configuration of a direct-current circuit breaker system 30 according to a second embodiment. The direct-current circuit breaker system 30 according to the second embodiment includes a plurality of direct-current circuit breakers 1a, 1b, 1c, and 1d connected in series. FIG. 6 is a diagram illustrating a configuration of the direct-current circuit breaker 1a according to the second embodiment. The other direct-current circuit breakers 1b, 1c, and 1d also have the same configuration as the direct-current circuit breaker 1a.

In FIG. 5, the left side of the direct-current line 2 in the drawing is connected to a converter (not illustrated) that converts an alternating-current system into a direct-current system. It is possible to apply the direct-current circuit breaker system 30 to a 320-kV power system by connecting the four direct-current circuit breakers 1a to 1d rated at 80 kV in series. That is, direct-current power of 320 kV is supplied from the converter (not illustrated) to the direct-current line 2.

As illustrated in FIG. 6, the direct-current circuit breaker 1a includes: the interrupter 3; the resonance circuit 4 including the capacitor 5, the activation switch 6, and the reactor 7; the lightning arrester 8; the charging circuit 9 including the charging switch 10 and a variable charging resistor 15; the voltage detection circuit 12; and a control circuit 25. In the direct-current circuit breaker 1a illustrated in FIG. 6, the charging resistor 11 in FIG. 1 has been replaced with the variable charging resistor 15, and the control circuit 20 in FIG. 1 has been replaced with the control circuit 25. Operation and functions of other constituent elements are the same as those illustrated in FIG. 1. Thus, redundant description will be omitted. The variable charging resistor 15 varies its resistance value under the control of the control circuit 25. Details thereof will be described below.

In a case where the direct-current circuit breaker system 30 in which a plurality of the direct-current circuit breakers 1a to 1d rated at 80 kV is connected in series is applied to the 320-kV power system and the capacitor 5 of each of the direct-current circuit breakers 1a to 1d is charged by system power, a rated voltage of each capacitor 5 is 80 kV. Thus, charging each capacitor 5 up to a system voltage of 320 kV causes overcharge, so that each capacitor 5 fails. Therefore, in the second embodiment, when the charging voltage Vc of each capacitor 5 reaches the rated voltage of 80 kV as a result of the charging of each capacitor 5, the charging switch 10 in a closed state is opened, so that a charging current Ic flowing through the charging switch 10 is interrupted to stop the charging. The charging switch 10 is a switch that can interrupt current.

Figure 7:
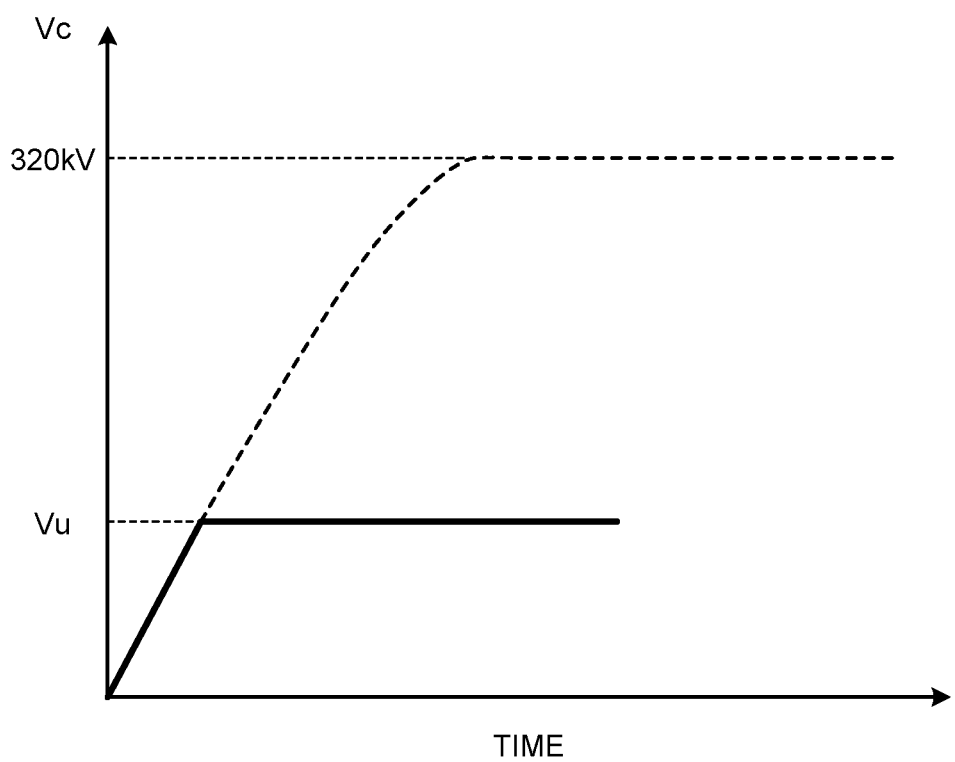
FIG. 7 is a time chart illustrating a state of charging of a capacitor of the direct-current circuit breaker according to the second embodiment.

FIG. 7 is a time chart illustrating a state of charging of the capacitor 5 of each of the direct-current circuit breakers 1a to 1d. In FIG. 7, the vertical axis represents the charging voltage Vc. The state of charging of the capacitor 5 is indicated by a solid line. When the charging switch 10 is closed, the capacitor 5 is charged, and the charging voltage Vc increases. When the charging voltage Vc reaches a fourth voltage value Vu that is the rated voltage, the charging switch 10 is opened to stop the charging. As a result, the capacitor 5 is prevented from being overcharged to the system voltage of 320 kV as indicated by a broken line.

Figure 8:
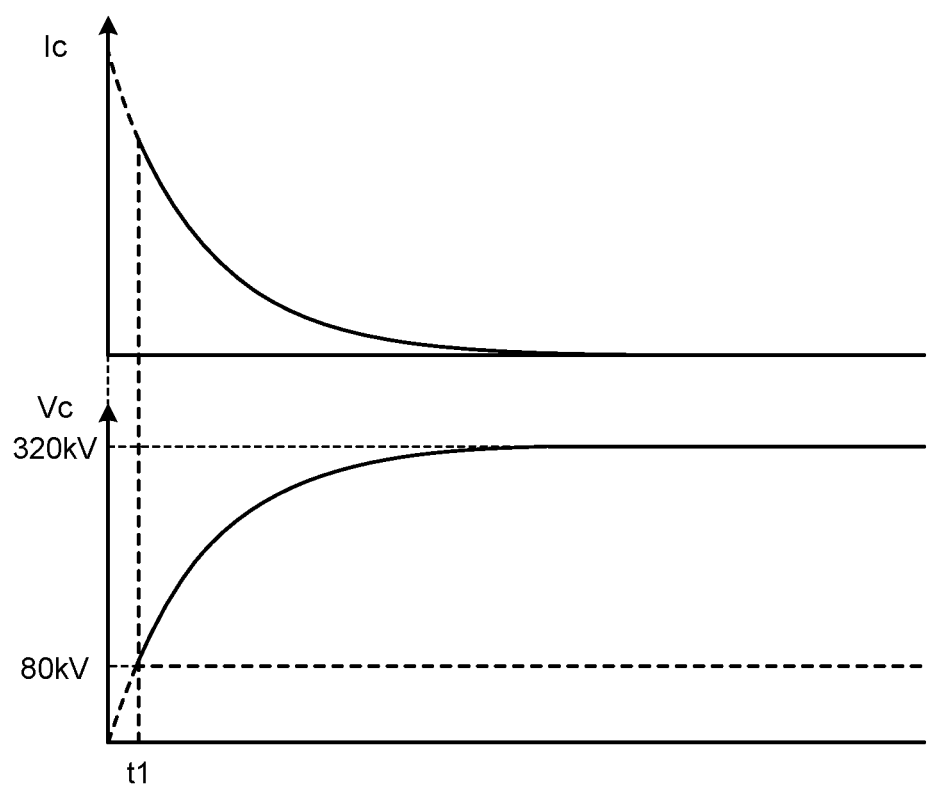
FIG. 8 is a time chart for describing interruption of charging current of the capacitor of the direct-current circuit breaker in the second embodiment.

When the charging voltage Vc of the capacitor 5 of each of the direct-current circuit breakers 1a to 1d reaches the fourth voltage value Vu as the prescribed rated voltage, the charging switch 10 interrupts the charging current Ic, so that charging can be stopped. At this time, the charging switch 10 needs to interrupt the charging current Ic before the charging current Ic reaches zero as illustrated in FIG. 8. FIG. 8 is a time chart for describing interruption of charging current of the capacitor of the direct-current circuit breaker in the second embodiment. FIG. 8 illustrates the relationship between the charging voltage Vc and the charging current Ic. As illustrated in FIG. 8, the value of the charging current is still large at time t1 at which the charging voltage Vc reaches 80 kV which is the rated voltage. However, when the charging current Ic is large, there is a possibility that it may be difficult to interrupt current by means of the charging switch 10. Therefore, in the second embodiment, the resistance value of the variable charging resistor 15 is increased before completion of charging so as to reduce the charging current Ic to a level at which the charging switch 10 can effectively interrupt the charging current Ic. Specifically, when the charging voltage Vc reaches a third voltage value V1 that is slightly smaller than the fourth voltage value Vu, which is the rated voltage of 80 kV, the resistance value of the variable charging resistor 15 is changed to a second resistance value larger than a first resistance value that is a resistance value of a steady state. As a result, current can be easily interrupted by the charging switch 10.

Figure 9:
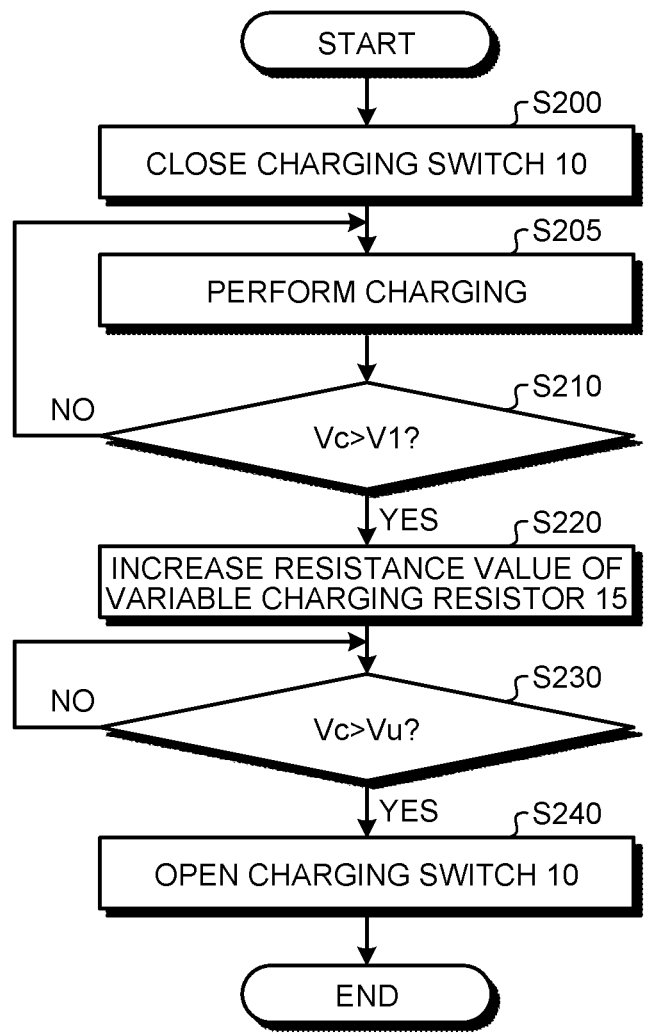
FIG. 9 is a flowchart illustrating charging operation of a control circuit in the second embodiment.

Hereinafter, operation of the control circuit 25 of each of the direct-current circuit breakers 1a to 1d of the second embodiment will be described with reference to FIG. 9. FIG. 9 is a flowchart illustrating charging operation of the control circuit 25 of the second embodiment. Here, operation of the control circuit 25 of the direct-current circuit breaker 1a will be described, but the control circuits 25 of the other direct-current circuit breakers 1b, 1c, and 1d also operate in the same manner. When operation of the direct-current circuit breaker 1a is started, the control circuit 25 closes the charging switch 10 (step S200). As a result, the capacitor is charged through a charging path indicated by arrows F in FIGS. 5 and 6, so that the charging voltage Vc increases (step S205).

The control circuit 25 monitors the charging voltage Vc obtained from a value detected by the voltage detection circuit 12. When the charging voltage Vc reaches the third voltage value V1 (step S210: Yes), the control circuit 25 changes the resistance value of the variable charging resistor 15 from the first resistance value, which is the resistance value of a steady state, to the second resistance value larger than the first resistance value (step S220). As a result, the charging current Ic flowing through the charging switch 10 decreases. Thereafter, when the charging of the capacitor 5 is completed, that is, when the charging voltage Vc reaches the fourth voltage value Vu (step S230: Yes), the control circuit 25 opens the charging switch 10 (step S240). When the charging switch 10 is opened, the charging current Ic is at the level at which the charging switch 10 can easily interrupt the charging current Ic, as a result of being reduced by the variable charging resistor 15. Thereafter, the charging switch 10 is in an open state. Therefore, the capacitor 5 is prevented from being discharged via the variable charging resistor 15 that is grounded.

Thereafter, as described in the first embodiment, the control circuit 25 performs control in such a way as to close the charging switch 10 when the charging voltage Vc falls below the second voltage value Vd, and to open the charging switch 10 when the charging voltage Vc exceeds the first voltage value Vu. Therefore, the charging voltage Vc can be kept within the range of the second voltage value Vd to the first voltage value Vu.

As described above, in the second embodiment, the resistance value of the variable charging resistor 15 is changed to the second resistance value larger than the first resistance value, which is the resistance value of a steady state, before the charging of the capacitor 5 is completed in the direct-current circuit breaker system 30 in which the plurality of direct-current circuit breakers 1a to 1d is connected in series. As a result, current can be easily interrupted by the charging switch 10. Furthermore, in the direct-current circuit breaker system in which the plurality of direct-current circuit breakers 1a to 1d is connected in series, each of the direct-current circuit breakers 1a to 1d stops charging the capacitor 5 at the rated voltage of a module included in each of the direct-current circuit breakers 1a to 1d, so that the capacitor 5 is prevented from being overcharged to the system voltage.

Figure 10:
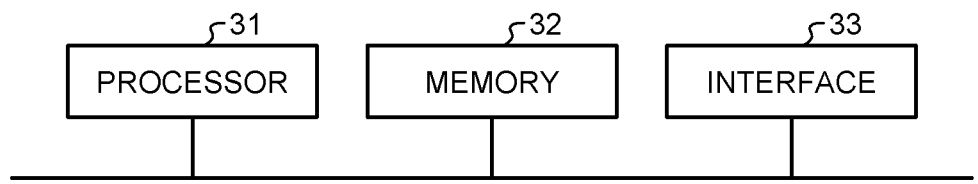
FIG. 10 is a block diagram showing an example of a hardware configuration of the control circuit included in the direct-current circuit breaker according to the first or second embodiment.

FIG. 10 is a diagram showing an example of a hardware configuration of the control circuit 20 included in the direct-current circuit breaker 1 according to the first embodiment, or the control circuit 25 included in each of the direct-current circuit breakers 1a to 1d according to the second embodiment. FIG. 10 illustrates a hardware configuration to be adopted when the functions of the control circuits 20 and 25 are implemented by use of hardware that executes programs. A processor 31, a memory 32, and an interface 33 are connected to each other via a bus.

The processor 31 is a central processing unit (CPU), a processing device, an arithmetic device, a microprocessor, a microcomputer, or a digital signal processor (DSP). Each function of the control circuits 20 and 25 is implemented by the processor 31, and software, firmware, or a combination of software and firmware. The software or firmware is written as a program, and stored in the memory 32 that is a built-in memory. The memory 32 is a nonvolatile or volatile semiconductor memory. Examples of the memory 32 include a random access memory (RAM), a read only memory (ROM), a flash memory, an erasable programmable read only memory (EPROM), and an electrically erasable programmable read only memory (EEPROM) (registered trademark).

The interface 33 plays a role as signal input and signal output. The interface 33 outputs a command to each of the interrupter 3, the activation switch 6, and the charging switch 10. A signal indicating a result of detection performed by the voltage detection circuit 12 is input to the interface 33.

The configurations set forth in the above embodiments show examples of the subject matter of the present disclosure, and it is possible to combine the configurations with another known technique, and is also possible to partially omit or change the configurations without departing from the scope of the present disclosure.

REFERENCE SIGNS LIST 1, 1a to 1d direct-current circuit breaker; 2 direct-current line; 3 interrupter; 4 resonance circuit; capacitor; 6 activation switch; 7 reactor; 8 lightning arrester; 9 charging circuit; 10 charging switch; 11 charging resistor; 12 voltage detection circuit; 15 variable charging resistor; 20, 25 control circuit; 30 direct-current circuit breaker system; 31 processor; 32 memory; 33 interface.

The invention claimed is:

1. A direct-current circuit breaker comprising:
an interrupter inserted in a direct-current line, the interrupter being closed in a steady state;
a resonance circuit connected in parallel to the interrupter, the resonance circuit including a capacitor, a reactor, and a first switch connected in series with each other, the first switch being open in a steady state;
a voltage detection circuit adapted to detect a charging voltage of the capacitor;
a charging circuit adapted to charge the capacitor at a direct-current potential of the direct-current line, the charging circuit including a charging resistor and a second switch connected in series, the charging resistor being grounded; and
a control circuit adapted to interrupt a direct current flowing through the direct-current line when an accident occurs, by closing the first switch, superimposing a resonance current generated by the resonance circuit on the direct current to create a current zero point, and opening the interrupter, wherein
the control circuit is adapted to:
close the second switch to charge the capacitor;
thereafter, open the second switch when the charging voltage having been detected exceeds a first voltage value; and
close the second switch when the charging voltage having been detected falls below a second voltage value that is smaller than the first voltage value.

2. The direct-current circuit breaker according to claim 1, wherein the first voltage value is a rated voltage.

3. A direct-current circuit breaker system comprising:
a plurality of direct-current circuit breakers connected in series, each of the direct-current circuit breakers including:
an interrupter inserted in a direct-current line, the interrupter being closed in a steady state;
a resonance circuit connected in parallel to the interrupter, the resonance circuit including a capacitor, a reactor, and a first switch connected in series with each other, the first switch being open in a steady state;
a voltage detection circuit adapted to detect a charging voltage of the capacitor;
a charging circuit adapted to charge the capacitor at a direct-current potential of the direct-current line, the charging circuit including a variable charging resistor and a second switch connected in series, the variable charging resistor being grounded and having a variable resistance value; and
a control circuit adapted to interrupt a direct current flowing through the direct-current line when an accident occurs, by closing the first switch, superimposing a resonance current generated by the resonance circuit on the direct current to create a current zero point, and opening the interrupter, wherein
the control circuit is adapted to:
close the second switch to charge the capacitor;
and thereafter, change the resistance value of the variable charging resistor from a first resistance value to a second resistance value larger than the first resistance value, the first resistance value being a resistance value of a steady state, when the charging voltage having been detected reaches a third voltage value; and then
open the second switch when the charging voltage having been detected exceeds a fourth voltage value that is larger than the third voltage value.

4. The direct-current circuit breaker system according to claim 3, wherein the fourth voltage value is a rated voltage of each of the direct-current circuit breakers.

* * * * *